(12) United States Patent
Atkins

(10) Patent No.: US 9,179,042 B2
(45) Date of Patent: Nov. 3, 2015

(54) SYSTEMS AND METHODS TO OPTIMIZE CONVERSIONS FOR WIDE GAMUT OPPONENT COLOR SPACES

(71) Applicant: Dolby Laboratories Licensing Corporation, San Francisco, CA (US)

(72) Inventor: Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/497,515

(22) Filed: Sep. 26, 2014

(65) Prior Publication Data

US 2015/0098650 A1    Apr. 9, 2015

Related U.S. Application Data

(60) Provisional application No. 61/888,992, filed on Oct. 9, 2013.

(51) Int. Cl.
| | |
|---|---|
| *G06K 9/00* | (2006.01) |
| *H04N 1/60* | (2006.01) |
| *H04N 9/67* | (2006.01) |
| *G06T 5/00* | (2006.01) |

(52) U.S. Cl.
CPC .............. *H04N 1/6008* (2013.01); *G06T 5/007* (2013.01); *H04N 1/6058* (2013.01); *H04N 1/6061* (2013.01); *H04N 9/67* (2013.01)

(58) Field of Classification Search
None
See application file for complete search history.

(56) References Cited

U.S. PATENT DOCUMENTS

| | | | |
|---|---|---|---|
| 5,596,428 A | 1/1997 | Tytgat | |
| 6,262,710 B1 | 7/2001 | Smith | |
| 6,519,361 B1 | 2/2003 | Taillie | |
| 6,735,334 B2 * | 5/2004 | Roberts | 382/167 |
| 7,058,234 B2 | 6/2006 | Gindele | |
| 7,173,736 B2 | 2/2007 | Yamada | |
| 7,576,889 B2 * | 8/2009 | Wang | 358/1.9 |
| 7,692,666 B1 | 4/2010 | Bourgoin | |
| 8,031,938 B2 | 10/2011 | Edge | |
| 8,224,080 B2 | 7/2012 | Sano | |
| 8,379,267 B2 | 2/2013 | Mestha | |
| 8,437,053 B2 | 5/2013 | Edge | |
| 8,488,192 B2 | 7/2013 | Mestha | |
| 8,831,343 B2 | 9/2014 | Kunkel | |
| 2003/0001860 A1 | 1/2003 | Yamazaki | |
| 2004/0263528 A1 | 12/2004 | Murdoch | |
| 2007/0133021 A1 | 6/2007 | Lee | |
| 2008/0239348 A1 * | 10/2008 | Kawai | 358/1.9 |
| 2009/0059326 A1 * | 3/2009 | Hong | 358/518 |

(Continued)

FOREIGN PATENT DOCUMENTS

WO    2013/086169    6/2013

OTHER PUBLICATIONS

Heckaman, R. et al "Brighter, More Colorful Colors and Darker, Deeper Colors Based on a Theme of Brilliance" Color and Imaging Conference, 16th Color and Image Conference, Mar. 30, 2010, pp. 112-116, Society for Imaging Science and Technology.

(Continued)

*Primary Examiner* — Li Liu

(57) ABSTRACT

Novel methods and systems for color space conversions are disclosed, relating to the optimization of a transformation matrix to convert between wide gamut opponent color spaces. The optimization may be based on whether the color values are in or out of gamut.

26 Claims, 15 Drawing Sheets

(56) References Cited

U.S. PATENT DOCUMENTS

| | | |
|---|---|---|
| 2009/0201309 A1 | 8/2009 | Demos |
| 2009/0284554 A1 | 11/2009 | Doser |
| 2010/0149203 A1* | 6/2010 | Mebane .................. 345/589 |
| 2010/0220237 A1 | 9/2010 | Doser |
| 2011/0115811 A1 | 5/2011 | Zhang |
| 2011/0255101 A1 | 10/2011 | Edge |
| 2012/0013635 A1 | 1/2012 | Beeman |
| 2012/0139937 A1 | 6/2012 | Marcu |
| 2013/0050245 A1 | 2/2013 | Longhurst |
| 2013/0114000 A1 | 5/2013 | Atkins |

OTHER PUBLICATIONS

Heckaman, Rodney L. "Brilliance, Contrast, Colorfulness, and the Perceived Volume of Device Color Gamut" Oct. 16, 2008, ProQuest LLC.

Casella, Stacey E. "Gamut Extension Algorithm Development and Evaluation for the Mapping of Standard Image Content to Wide Gamut Displays" Nov. 2008.

Bratkova, M. et al "oRGB A Practical Opponent Color Space for Computer Graphics" Jan.-Feb. 2009, IEEE Computer Graphics Application, pp. 42-55.

Moroney, N. et al "The CIECAM02 Color Appearance Model" 2002, 10th Color and Imaging Conference Final Program and Proceedings, pp. 23-27.

Moroney, Nathan "The Opposite of Green is Purple?" Mar. 2009, presented at the Human Vision and Electronic Imaging XIV Conference, San Jose, CA.

Moroney, Nathan, "Usage Guidelines for CIECAM97s" Mar. 2000, Image Processing Image Quality, Image Capture, Systems Conference, Portland OR.

* cited by examiner

SYSTEMS AND METHODS TO OPTIMIZE CONVERSIONS FOR WIDE GAMUT OPPONENT COLOR SPACES

CROSS REFERENCE TO RELATED APPLICATIONS

This application claims the benefit of priority to U.S. Provisional Application Ser. No. 61/888,992, filed on Oct. 9, 2013, which is incorporated herein by reference in its entirety.

TECHNICAL FIELD

The present disclosure relates to color space conversions. More particularly, it relates to systems and methods for optimizing conversions for wide gamut opponent color spaces.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
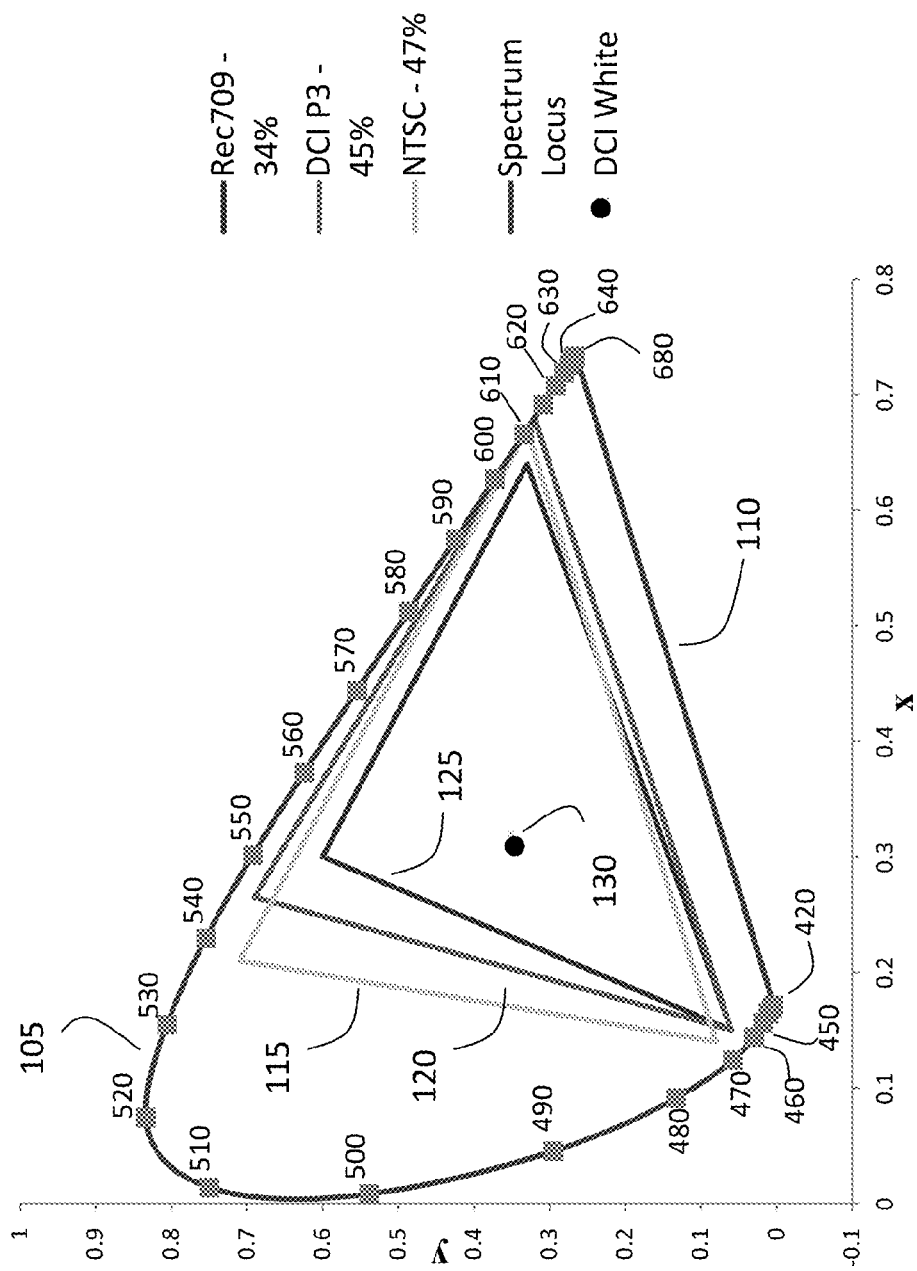
FIG. 1 depicts different exemplary standard gamuts within the CIE standard color space.

In a first aspect of the disclosure, a method to perform opponent color space conversion is described, the method comprising: generating, by a computer, one or more codewords in a first opponent color space; performing a color space conversion, thereby converting the one or more codewords in the first opponent color space to a second color space; and optimizing, by a computer, the color space conversion in order to increase a number of colors in the second color space that can be perceived by a human visual system.

In a second aspect of the disclosure, a system is described, the system comprising: a sampling module, configured to sample, by a computer, color values of an image; a gamut determination module, configured to determine, by a computer, whether a color value is in-gamut; an optimizer module, configured to optimize, by a computer, a transformation matrix between color spaces; and a converter module, configured to convert, by a computer, color values between the color spaces.

DETAILED DESCRIPTION

The CIE XYZ color space was created by the International Commission on Illumination (CIE), being derived from the CIE RGB color space. The CIE XYZ is a tristimulus color space, based on the fact that the human eyes possess three different cones, each sensitive to a different spectrum (roughly corresponding to red, green and blue).

In the CIE model, the Y parameter is defined as luminance. The Z parameter is quasi-equal to blue color stimulation, and the X parameter is a linear combination of cone response curves chosen to be nonnegative. Defining Y as luminance has the useful result that for any given Y value, the XZ plane will contain all possible chromaticities at that luminance. As it is known by person skilled in the art, colors can have the same chromaticity but different luminance. For example, white and grey have different luminance but same chromaticity. Thus, the chromaticity forms a plane for each value of luminance, thereby forming a three-dimensional color space.

The YXZ is one color space. Oftentimes it is necessary to transform from one color space to another color space. This transformation is generally called gamut mapping.

As used herein, the phrase "gamut mapping" may relate to processing methods that may be performed or computed to achieve accurate color conversion between different gamuts, e.g., RGB output from a specific camera to RGB input of a specific display device. A color space is a representation of colors described by a certain choice of parameters, e.g. the RGB color space describes colors by a combination of three variables—red, green and blue. The gamut of a device or process is simply the entirety of colors that can be represented by that device or process, within a certain color space. Generally speaking, a gamut is a subset of a color space, as most devices and processes can only realize a smaller subset of a certain color space. A gamut depends on the specific device—different devices using the same standardized color space might still have different gamuts. A specific device, such as a digital camera, will have its own gamut, describing what colors can be accurately captured and transmitted as output by that camera. Similarly, a specific display device, e.g., an emissive or projective device, is only able to display a certain number of colors: those within its gamut.

A digital image may need to be converted from one color space to another, e.g., to be displayed on a TV after being captured by a camera. A color in the original digital image which lies within a first color space may fall outside the gamut of the second color space, in which case it cannot be displayed in the second color space. In fact, different color spaces are able to accurately represent different colors. For example, a highly saturated (deep) red can be represented in the RGB color space, but not in the CMYK color space. Image processing attempts to solve this problem by some type of transformation (mapping) which converts the color outside a certain gamut to a different color inside that gamut, e.g., gamut mapping.

Gamut mapping can be done in different ways, but it is generally not a simple matter of preserving as much as possible an affinity between the original color outside the gamut and the replacement color inside the gamut. The human eyes perceive colors in a way that is relative to nearby colors in a specific image, therefore it is generally necessary, in gamut mapping, to take into consideration the other colors present in a picture. A simple example would be an image which contains two different gradations of red, one outside and one inside the gamut of the color space in which an image has to be described. If the red out of gamut is simply transformed into a red inside the gamut, any perceptual difference between the original two reds might be inadvertently canceled, by making the two reds, now both inside the gamut, too similar to each other. In that case, it might be necessary to transform not only the original red out of gamut, but also the original red inside of gamut, in such a way as to keep them both inside the gamut, but maintain a difference when perceived by the human eyes.

Therefore, accurate ways to transform from one color space to another have many applications. Generally, a transformation matrix is employed to transform from one color space to another. Specifically, a 3×3 transformation matrix is employed.

As used herein, the phrase "wide gamut" comprises a color space which has a larger than average gamut. In other words, a standard gamut might cover 50% of visible colors as perceived by a human observer. A wide gamut color space might comprise 70% or more of visible colors as perceived by a human observer.

The present disclosure relates to opponent color spaces. As it is known to the person skilled in the art, opponent color spaces are based on differences between the signals of the three human cones. Opponent color theory considers three distinct channels: red versus green, blue versus yellow and black versus white. Responses to one color of an opponent channel (such as blue) are antagonistic to those of the other color in the same channel (yellow, in this example). In other words, opposite opponent colors are not perceived together. For example, red and green are not perceived together as a single color, but always as separate colors.

As used herein, the phrase "chroma subsampling" refers to the practice of encoding images by implementing less resolution for chroma information than for luminance information, based on the fact that the human visual system has a lower acuity for color differences than for luminance. Therefore, differences in chromaticity are less noticeable to humans than differences in luminance. In digital image processing, there is often a specific amount of bandwidth available to transmit or process signals. The bandwidth is generally allocated in such a way as to give the best image quality possible, for that bandwidth. By assigning a higher portion of the available bandwidth to luminance information than for chromaticity information, a higher perceived image quality can be obtained. Alternatively, the required bandwidth for a desired image quality can be reduced by chroma subsampling.

Image signals are often encoded with opponent color axes, such as YCbCr. As understood by the person skilled in the art, using opponent color axes makes it possible to perform chroma subsampling on an image or video signal while substantially conserving visual quality.

In several embodiments of the present disclosure, a method is described for generating an optimized 3×3 transformation matrix to transform a XYZ color data into YCC (YCxCz) data. In other words, through a transformation matrix, a color in the XYZ color space can be transformed into the YCC color space.

The use of the XYZ and YCC color spaces in several examples of the present disclosure should not be intended as a limitation. The person skilled in the art will understand that different color spaces may be used. The present disclosure relates to methods and systems for optimizing an opponent color space conversion to encode only colors visible to the human visual system. Therefore, any color space which falls within the scope of such optimization may be considered as within the scope of the systems and methods described herein. In particular, similar considerations to those related herein to the XYZ color space can be applied to any wide-gamut color space. In general, the systems and methods of the present disclosure relate to any color space where one or more of the primaries is outside of the spectrum locus.

As understood by the person skilled in the art, for existing color systems to date the transformation matrix between color spaces has been determined by the primary functions or it has been optimized for codec performance (e.g. KLT codec).

FIG. 1 depicts a comparison between several common RGB gamuts in the CIE 1931 xy color space. They all lie within the xy chromaticity diagram format defined by the standard CIE 1931. In the xy diagram, a boundary is defined by a horseshoe shape (105) and a straight line (110) between the two ends of the horseshoe shape. The outer boundary of the horseshoe shape (105), the spectral locus, is where the pure colors reside, ranging from a wavelength of $\lambda_{min}$ (here ~420 nm, e.g. violet) to $\lambda_{max}$ (here ~680 nm, e.g. red). The straight line between the $\lambda_{min}$ point and the $\lambda_{max}$ point (110) represents color mixtures of red and blue, and it is called the magenta line.

Within this range of possible colors, different RGB color spaces are able to represent a subset of the possible colors. For example, the NTSC television standard (115) has a coverage of 47%, the DCI cinema standard (120) has a coverage of 45%, while the Rec. 709 high definition TV standard (125) has a coverage of 34%.

Starting from the boundary and moving towards the inside of the horseshoe shape decreases saturation (or, similarly expressed, increases the wavelength bandwidth), and as a consequence colors turn to white. The black dot (130) indicates the white color as defined by the DCI cinema standard, as an example.

A color will be represented, within a specific color space, by a color signal, or color code), such as, for example, a three-dimensional vector. A color code may be based on the XYZ color space. The XYZ color space is based on the RGB color space, but many possible combinations of XYZ codes are not visible to the human eye. In other words, unlike conventional RGB space, XYZ space contains many color combinations that are not visible to the human eye. This means that it may be inefficient, bandwidth-wise, to encode several color codes in the XYZ color space, as they are not visible. Therefore, it may be advantageous to transform color codes from the XYZ space to another space, such as the YCC space. The YCC space also allows for chroma subsampling, an important feature. It is not possible to subsample chroma in the XYZ space.

Figure 2:
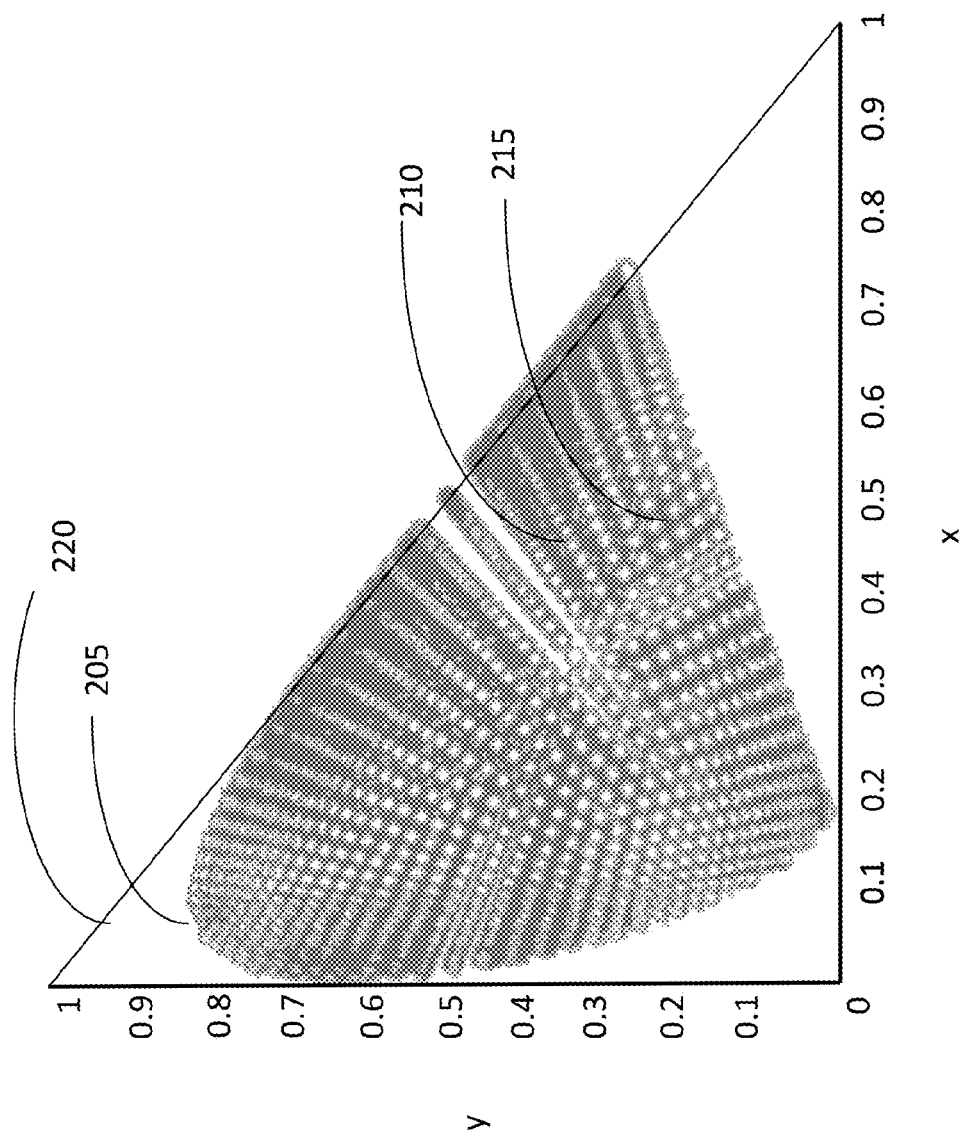
FIG. 2 illustrates an example of color sampling within the spectrum locus.

FIG. 2 illustrates an example of XYZ color encoding. The white dots (210) within the horseshoe shape, the spectral locus (205), represent exemplary color codes of the XYZ color encoding. The dark grey dots (215) filling up the rest of the area defined by the boundary of the spectral locus (205) represent the only colors actually visible to the human eye. Each dot is a sample of a color combination in XYZ space. The XYZ colors also comprise the area outside the spectral locus (205), defined by the x and y axis and the line (220).

As it is known to the person skilled in the art, using existing techniques to determine a color signal matrix results in the following standard conversion from XYZ to YCxCz:

$$M_s = \begin{pmatrix} 0 & 0 & 0.5000 \\ 1.0000 & -0.5000 & -0.5000 \\ 0 & 0.5000 & 0 \end{pmatrix}$$

The above standard matrix is a possible way to for distributing XYZ color content with opponent color systems. When all possible XYZ color codes are converted with this matrix, it is possible to see that the range of values for the color codes is Y=(0,1), Cx=(−0.5,0.5), Cz=(−0.5,0.5). Usually, 0.5 is added to the second and third components to scale all three values to the range of (0,1). However, as understood by the person skilled in the art, there are other alternatives possible to re-center the desired white point at (0.5,0.5).

Figure 3:
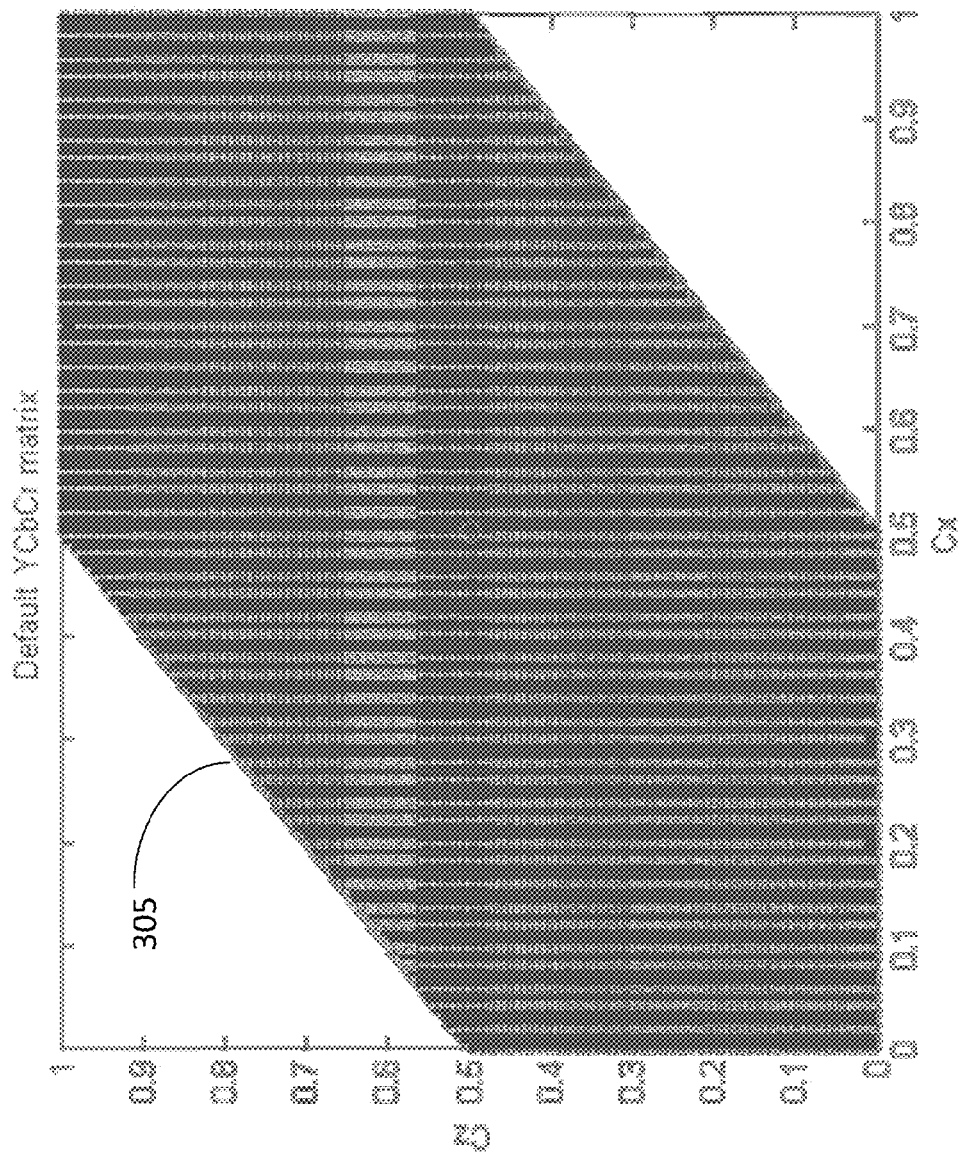
FIG. 3 illustrates the conversion of all colors from XYZ to YCC.

FIG. 3 illustrates the result of converting all colors from XYZ to YCC, in a Cx-Cz plane.

Figure 4:
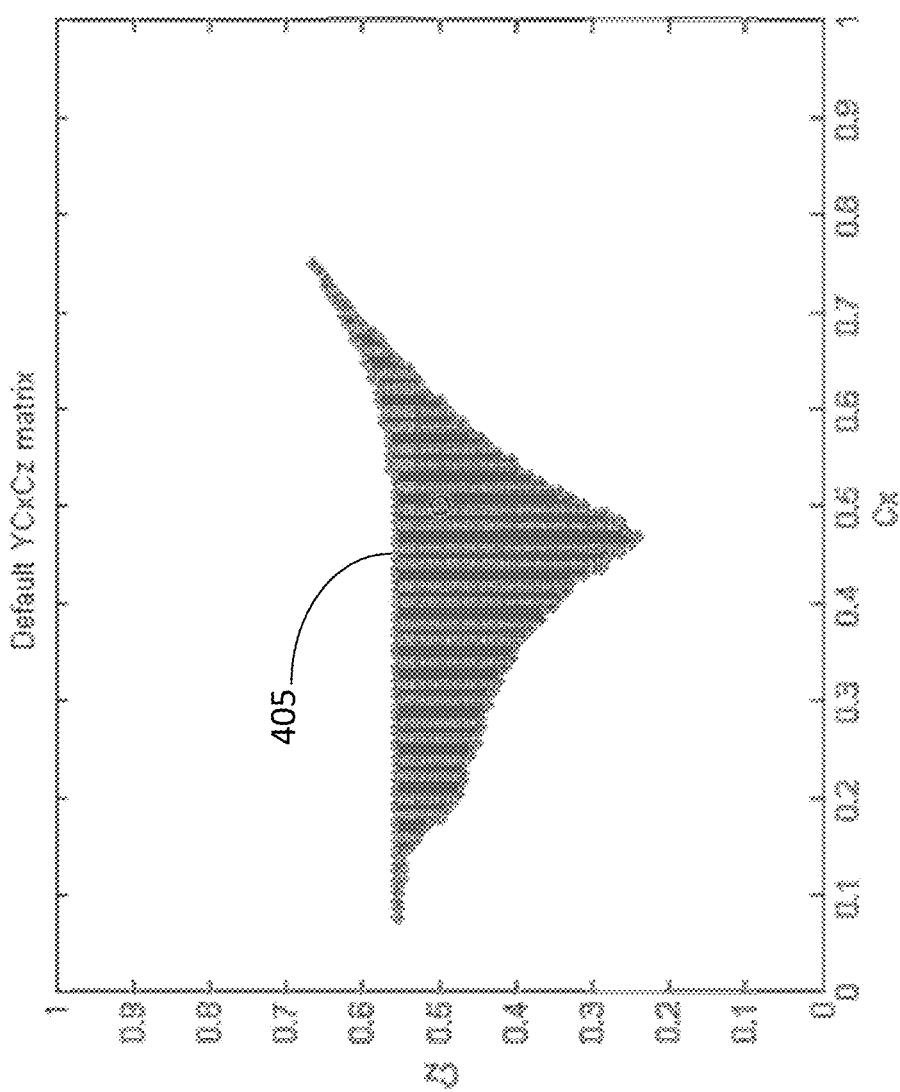
FIG. 4 illustrates a reduced set of transformed color code values.

However, by applying the standard XYZ to YCC matrix above limited to colors which are in-gamut, only a small portion of code values are used to represent visible colors. FIG. 4 illustrates such reduced set of color code values.

By comparing area (305) in FIG. 3 to area (405) in FIG. 4, it is possible to see that area (305) in FIG. 3 is larger than area (405) in FIG. 4. In other words, many color code values in FIG. 3 are represented, which are not actually visible. Such excess color codes employ valuable computational power and bandwidth, with no advantage to image quality. Additionally, such excess color codes may also mean that fewer codes are available to represent visible colors. This can result in higher quantization error.

In the present disclosure, systems and methods are described to optimize an opponent color matrix, in order to employ the available color codes only for visible colors.

Figure 5:
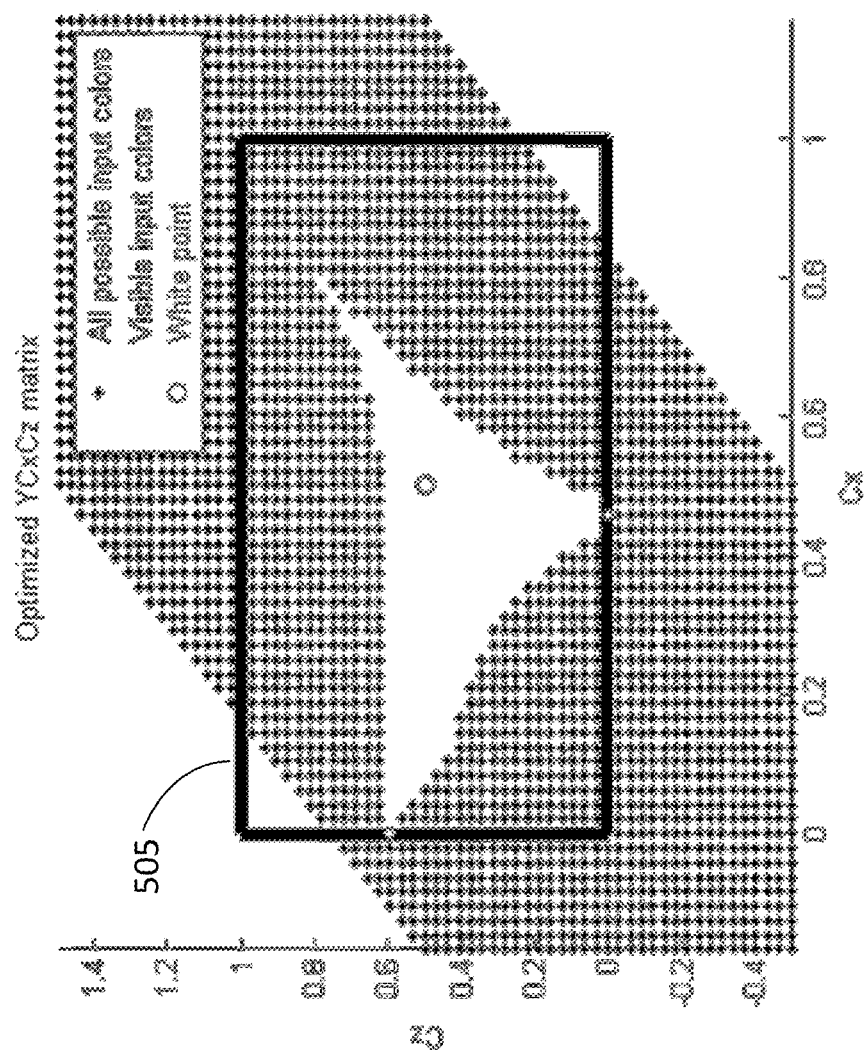
FIG. 5 illustrates an optimized transformation.

FIG. 5 illustrates an exemplary result of using an optimized transformation matrix to transform from XYZ to YCC, optimizing for visible colors.

The optimized matrix applied in FIG. 5 employs more of the available code words for visible colors, compared to the matrix applied in FIG. 4. As visible in FIG. 5, area (505) in FIG. 5 is larger than area (405) in FIG. 4.

Referring to FIG. 5, colors that are not in the visible gamut are now out-of-range. The white point is maintained at the center (0.5, 0.5) but could also be further optimized to allow improved performance.

An example of an optimized matrix is:

$$M_o = \begin{pmatrix} 0 & 0 & 0.9697 \\ 1.0000 & -0.5926 & -0.9697 \\ 0 & 0.5926 & 0 \end{pmatrix}$$

The person skilled in the art will understand that different types of optimized matrixes may be used.

Figure 6:
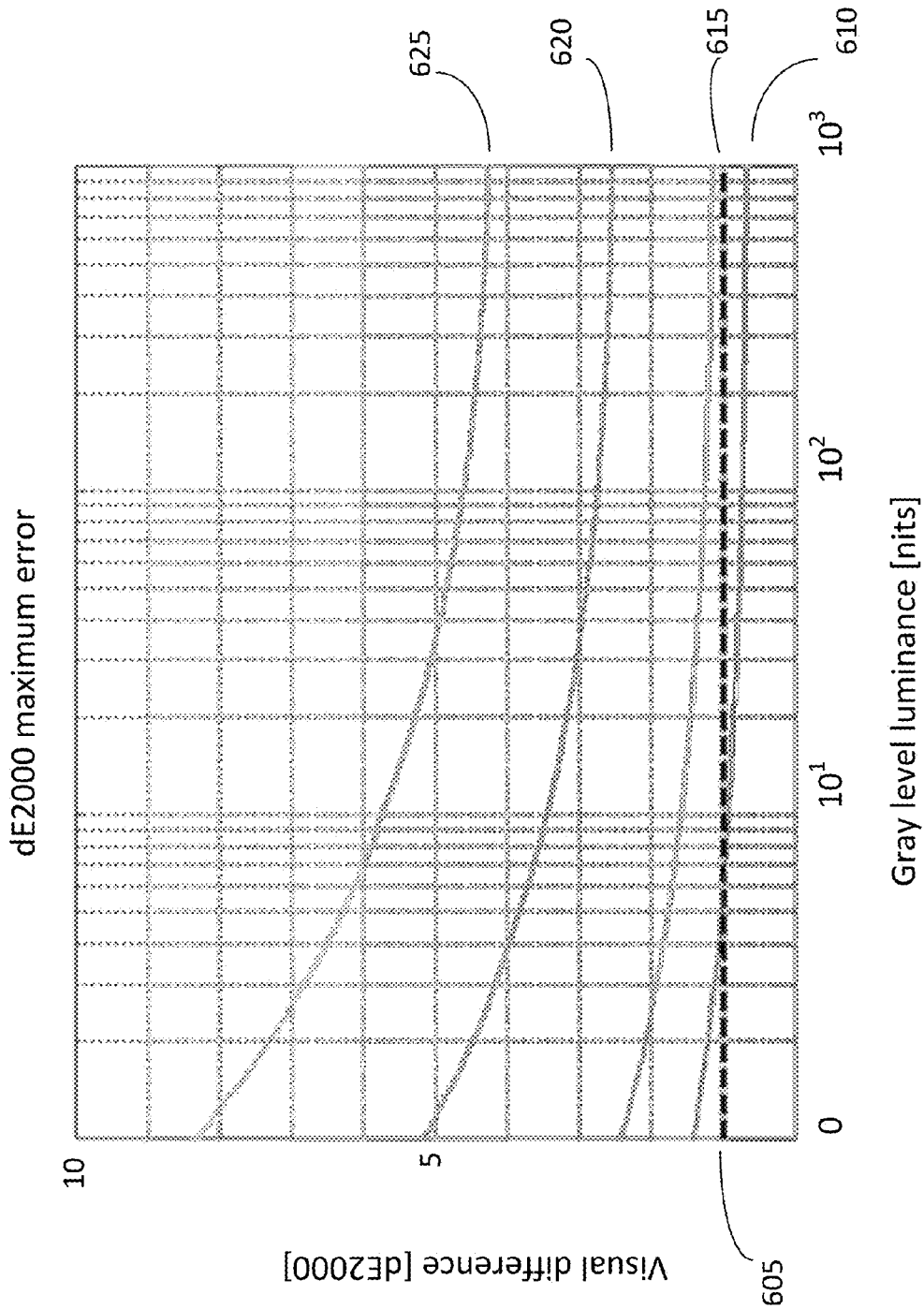
FIG. 6 illustrates a predicted baseband signal performance.

FIG. 6 illustrates a predicted baseband signal performance due to quantization at 10 and 12 bits, for both the standard matrix $M_s$ and the optimized matrix $M_o$. The visual difference between colors is described by using the standard CIEDE2000, which is known to the person skilled in the art, and measures a 'distance' between colors.

In FIG. 6 the visual difference threshold (605) marks the point of detection of visual differences for the human eyes. Lines (610, 615, 620, 625) represent the same color code encoded in 10 or 12 bit, either with the default or optimized matrix. Line (610) is the 12 bit XYZ color code encoded with the optimized matrix; line (615) is the 12 bit XYZ color code encoded with the default standard matrix; line (620) is the 10 bit XYZ color code encoded with the optimized matrix; line (625) is the 10 bit XYZ color code encoded with the default standard matrix.

For both the 10 bit and 12 bit XYZ color codes, there is a marked improvement (a decrease) in visual difference by using an optimized matrix compared to the default standard matrix. In other words, line (610) is an improvement upon line (615), and line (620) is an improvement upon line (625).

Higher error in visual difference leads to greater potential for visible quantization. An error of 1.0 is generally considered to be just about visible. As seen in FIG. 6, there is a significant improvement in performance using the optimized matrix.

In some embodiments, the steps for producing an exemplary optimized matrix comprise the following, where the notation used is standard and will be understood by the person skilled in the art:

1) Computing a sampled array of color values (such as XYZ color values)—for example, 65 samples along each axis of the XYZ color cube for a total of $65^3$=274625 samples.
2) Determining which points fall inside the spectral locus, for example by
   a. Converting XYZ samples to the Yxy color space.
   b. Loading a sample of points along the spectral locus (produced from pure wavenlengths convolved by the color matching functions).
   c. Converting points on the spectral locus to Yxy color space.
   d. Computing a Delaunay triangulation from the spectral locus points.
   e. For each XYZ sample point, checking if it falls inside the convex hull formed by the spectral locus points. If it falls inside the convex hull then it is considered "in gamut", otherwise "out of gamut".
3) Converting in-gamut points to the XYZ color space and encoding with a desired non-linear function (e.g. a gamma function or a perceptual quantizer (PQ) function. For example, an exemplary PQ function is described in PCT Application Ser. No. PCT/US2012/068212, filed on Dec. 6, 2012, and published as WO 2013/086169, which is incorporated herein by reference in its entirety)
4) Defining an initial opponent color conversion M (e.g. the "default standard matrix" $M_s$)
5) Optimizing the opponent color conversion such that the full range of −0.5 to 0.5 is used for the opponent colors, for example by
   a. Finding a scaler function S, which, as an example, in MATLAB language, may be expressed as:

$M(:,1)=M(:,1)*S(1);$ $M(:,2)=M(:,2)*S(2);$ $M(:,3)=M(:,3)*S(3);$ b. Computing YCxCz values from XYZ values $YCxCz=XYZ*M;$ $YCxCz(:,2:3)=YCxCz(:,2:3)+0.5;$ c. Determining the maximum range of resulting YCxCz values $minY=min(YCxCz(:,1));$ $maxY=max(YCxCz(:,1));$ $minCb=min(YCxCz(:,2));$ maxCb=max(YCxCz(:,2));

minCr=min(YCxCz(:,3));

maxCr=max(YCxCz(:,3));

d. Computing an error metric D based on how close to the allowable limits the resulting values are, for example by:

D=[max(0,minY)max(0,−minY)^0.5 max(0,1−maxY) max(0,maxY−1)^0.5 max(0,minCb)max(0,−minCb)^0.5 max(0,1−maxCb)max(0,maxCb−1) ^0.5 max(0,minCr)max(0,−minCr)^0.5 max(0, 1−maxCr)max(0,maxCr−1)^0.5];

e. Minimizing the error metric using, for example, least-squares optimization routines, or other alternative optimization routines.

6) Reporting the final optimized matrix $M_o$, where the optimized matrix is based on adjusting the default standard matrix $M_s$, for example through the scaler S as in step 5) a).

Another embodiment of the disclosure relates to the optimization of a particular set of a color space that falls inside the spectral locus. For example, if content is created on a reference display with P3 color primaries, then the color signals cannot contain any colors outside of the P3 color gamut.

In this embodiment, steps 1) and 2) as described for the previous embodiment are modified as explained in the following. At first, a sample of all possible RGB values is created, and subsequently the color codes are converted from the P3 color space to the XYZ color space by using a 3×3 transformation matrix. All color code points will now fall within the spectral locus already, since the reference display must produce "real", visible colors.

Figure 7:
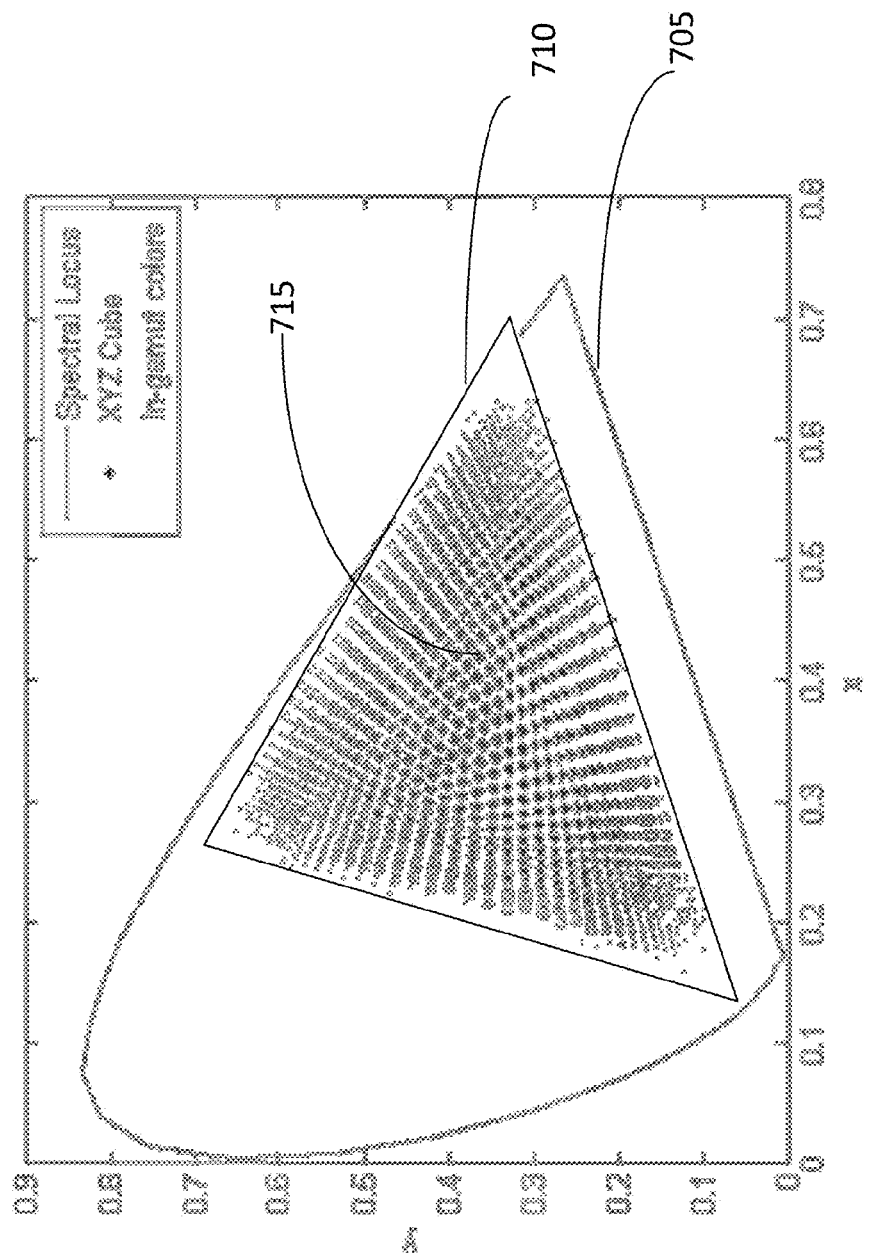
FIG. 7 illustrates a spectral locus and gamut.

FIG. 7 illustrates the spectral locus (705), and the area delimiting colors inside of gamut (710). It can be noted that part of the gamut (710) is outside the spectral locus (705). The dark points (715) inside the gamut (710) are the new sample points of the XYZ color cube after applying the P3 to XYZ color conversion matrix.

Figure 8:
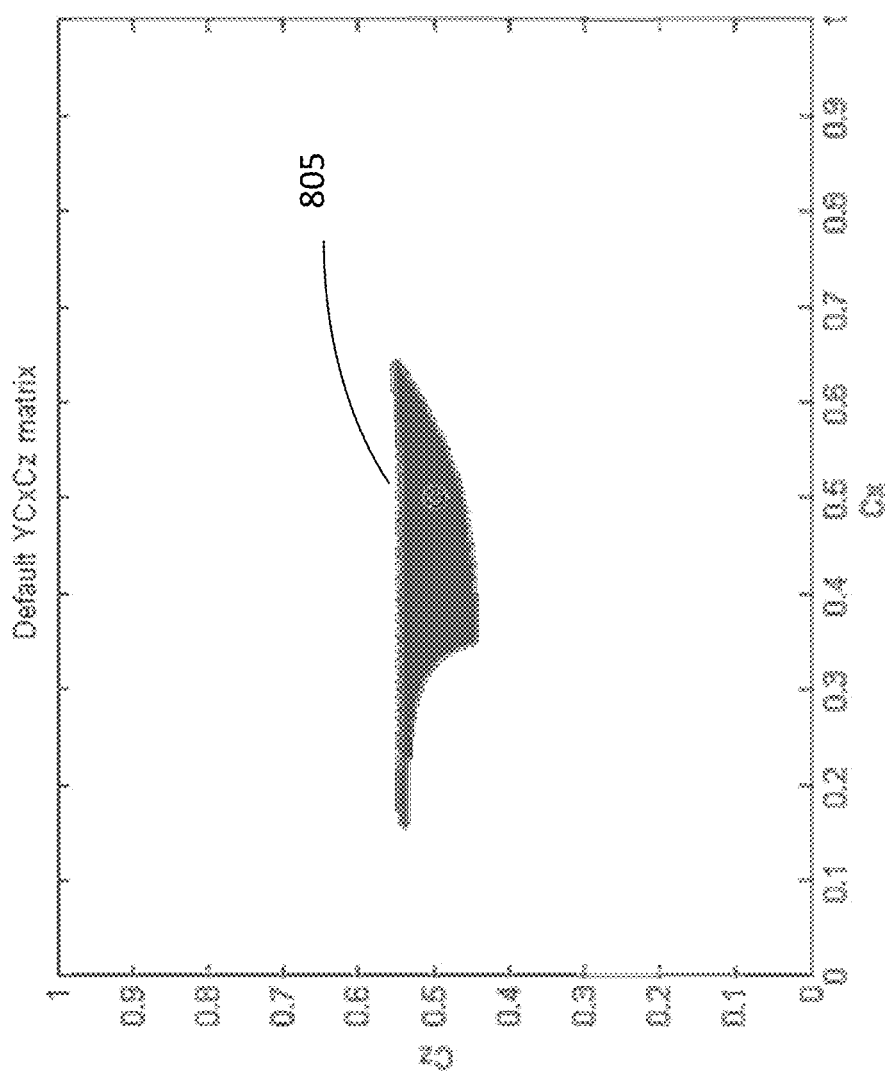
FIG. 8 illustrates an application of the default standard transformation matrix.

FIG. 8 illustrates the application of the default standard transformation matrix to the color codes in the gamut (710) of FIG. 7 and the resulting color codes (805).

Figure 9:
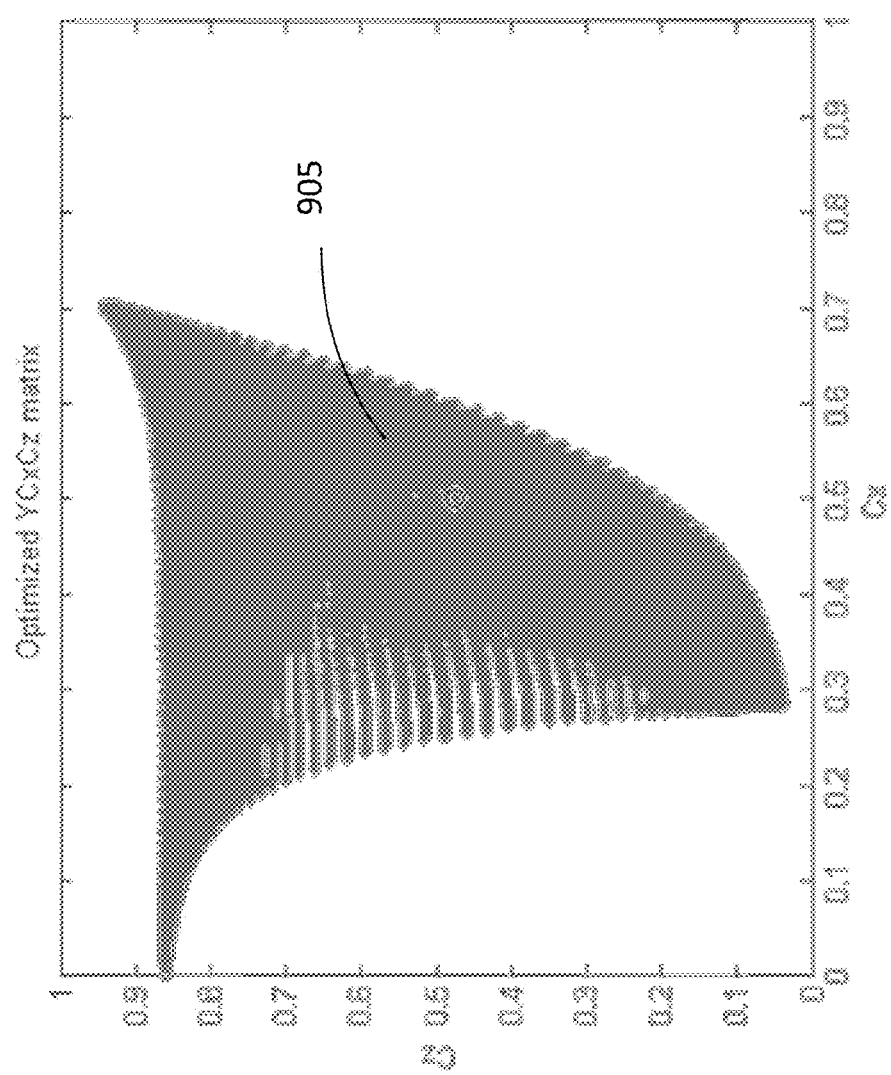
FIG. 9 illustrates an application of the optimized transformation matrix.

FIG. 9 illustrates the application of an optimized transformation matrix to the color codes in the gamut (710) of FIG. 7 and the resulting color codes (905).

Figure 10:
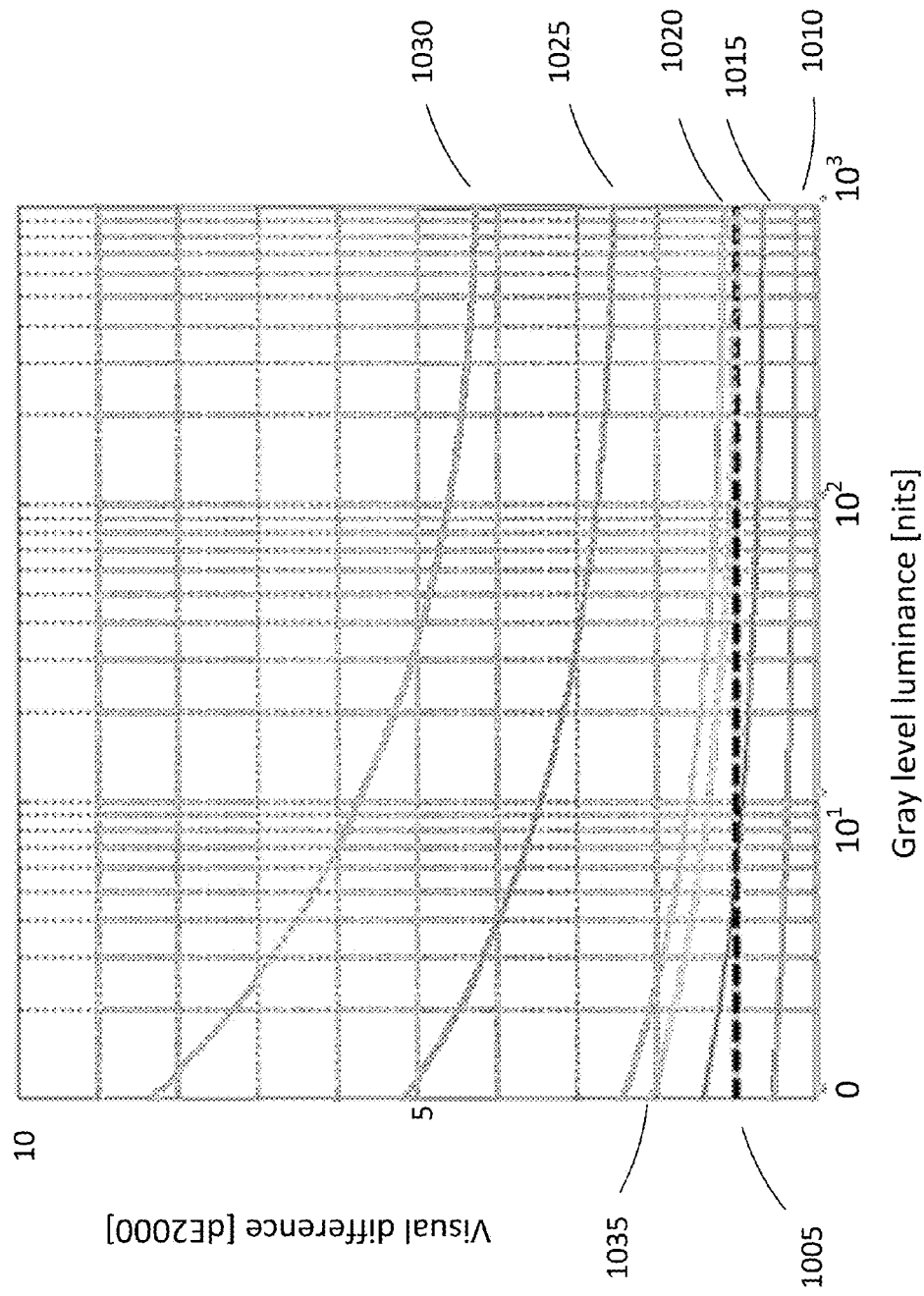
FIG. 10 illustrates a quantization performance for the matrix optimized for P3 color primaries.

Optimizing for a smaller color gamut greatly increases the code word efficiency. FIG. 10 illustrates the quantization performance for the matrix optimized for P3 color primaries, compared to that of the matrix optimized for the area contained in the spectral locus, as well as to that of the standard matrix.

Referring to FIG. 10, the visual difference threshold (1005) marks the point of detection of visual differences for the human eyes. Lines (1010, 1015, 1020, 1025, 1030, 1035) represent the same color code encoded in 10 or 12 bit, either with the default matrix, the optimized matrix for the spectral locus, or the optimized matrix for the P3 gamut.

Line (1010) is the 12 bit XYZ color code encoded with the optimized matrix for the P3 gamut; line (1015) is the 12 bit XYZ color code encoded with the optimized matrix for the spectral locus; line (1020) is the 12 bit XYZ color code encoded with the default standard matrix.

Line (1035) is the 10 bit XYZ color code encoded with the optimized matrix for the P3 gamut; line (1025) is the 10 bit XYZ color code encoded with the optimized matrix for the spectral locus; line (1030) is the 10 bit XYZ color code encoded with the default standard matrix.

For both the 10 bit and 12 bit XYZ color codes, there is a marked improvement (a decrease) in visual difference by using an optimized matrix compared to the default standard matrix. In this embodiment, related to a display with a P3 gamut, there is also an improvement in visual difference by specifically optimizing the matrix for the P3 gamut, instead of optimizing for the full area defined by the spectral locus.

In some embodiments of the present disclosure, systems and methods are described to provide an optimized conversion from XYZ to YCC for a given image video content. For example, if content is created that has color samples that fall outside the spectral locus (for example from a camera), then the default matrix can be used. Such may be the case for noisy content where error signals produce out-of-range values. In a second step, the content may be adjusted while viewing on a reference monitor. At this time, the YCC matrix may be optimized for the color primaries of the reference monitor, for example P3 or Rec2020. The optimized YCC matrix can then be associated with the image content. Using the optimized YCC matrix can improve the baseband quantization of the video signal, particularly in a distribution scenario where the signal is quantized to a lower bit depth (e.g. 8, 10, or 12 bits).

A further embodiment of a method of the disclosure would be to analyze the video signal on a scene-by-scene or frame-by-frame basis, and optimizing the transformation matrix given the video content. For example, one scene may not use the blue region of the color gamut, and another scene may not use the red region of the color gamut. By adapting the matrix to the scene further baseband quantization performance can be achieved. In other words, optimization of the transformation matrix from one color space to another can be carried out based on the specific color gamuts involved. In some embodiments, such optimization is for opponent color spaces.

Further embodiments would be to also optimize for centering a particular white point (e.g. D65) at the center 0.5, 0.5. Alternatively, the white point could be unconstrained completely, in which case the optimization could occur directly on the transformation matrix M instead of the scaler S.

Figure 11:
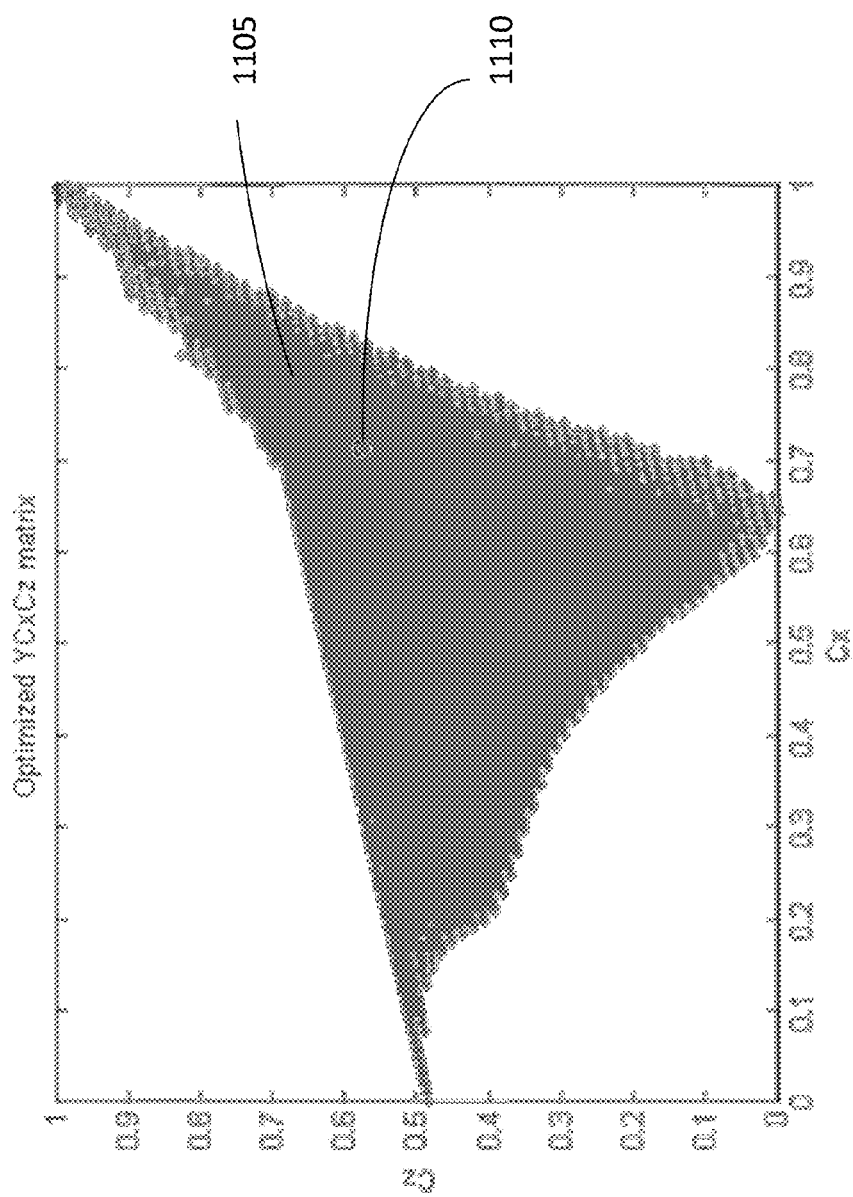
FIG. 11 illustrates an exemplary result of optimizing the transformation matrix with an unconstrained white point.

FIG. 11 illustrates an example result of color codes (1105) obtained by optimizing the transformation matrix with an unconstrained white point (1110).

As understood by the person skilled in the art, the systems and methods of the present disclosure comprise taking into account three different levels of information: 1. The human spectral locus; 2. The color space of the reference (or source) display; 3. The color information in the actual video data being used.

Figure 12:
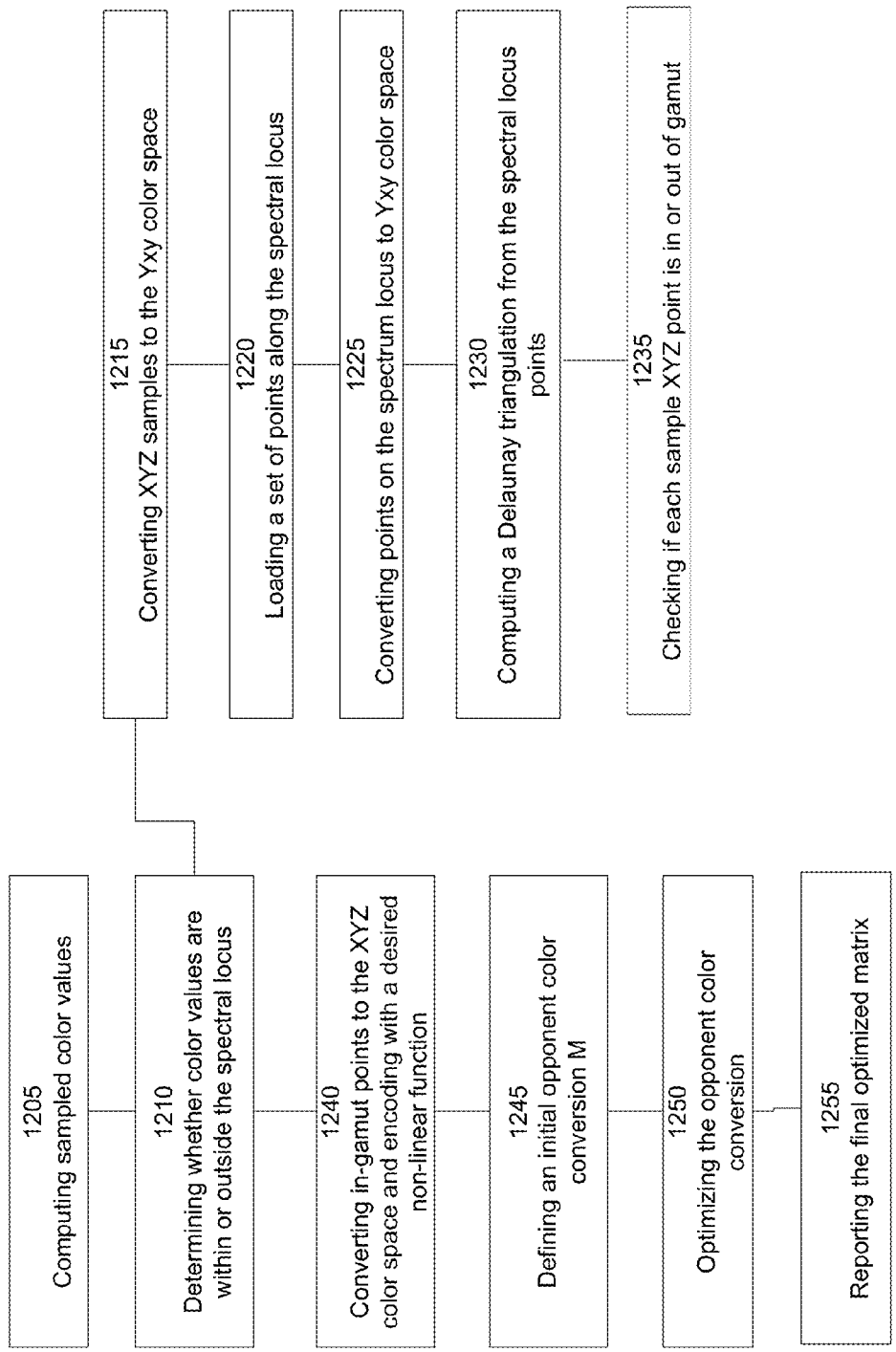
FIG. 12 illustrates an exemplary method for converting color values.

FIG. 12 illustrates an example embodiment of a method of the disclosure, comprising: computing sampled XYZ color values (1205) and determining which color values fall inside the spectral locus (1210).

An example of step (1205) can comprise: converting XYZ samples to the Yxy color space (1215); loading a sample of points (color values) along the spectral locus (1220); converting points on the spectral locus to Yxy color space (1225); computing a Delaunay triangulation from the spectral locus points (1230); and for each XYZ sample point, checking if it falls inside the convex hull formed by the spectral locus points (1235). If the sample point falls inside the convex hull then it is considered "in gamut", otherwise "out of gamut".

Further steps after step (1205) can comprise: converting in-gamut points to the XYZ color space and encoding with a desired non-linear function (1240); defining an initial opponent color conversion M (1245); optimizing the opponent color conversion such that the full range of −0.5 to 0.5 is used for the opponent colors (1250).

Figure 13:
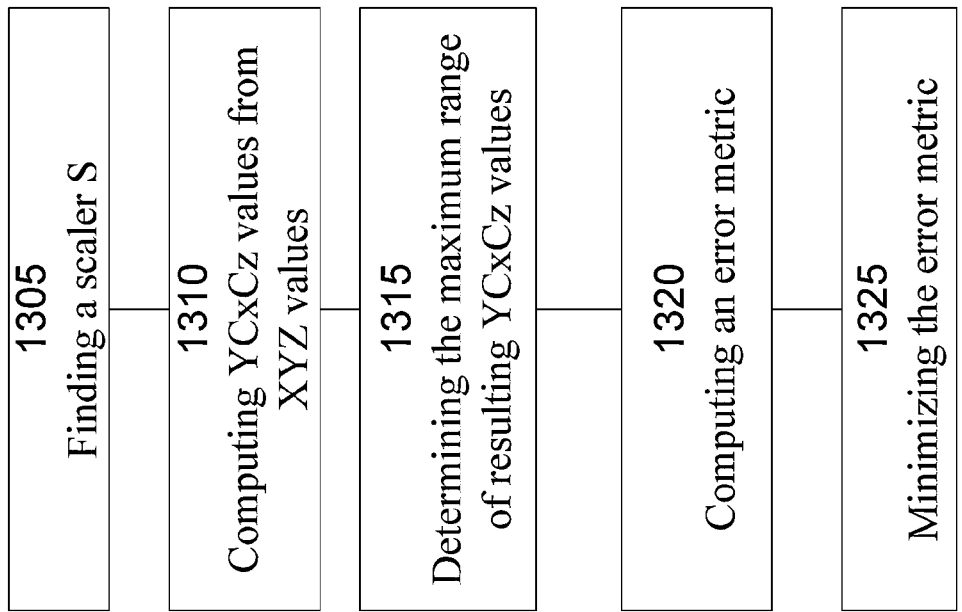
FIG. 13 illustrates another exemplary method for converting color values.

Referring now to FIG. 13, an example of step (1250) can comprise: finding a scaler S (1305); computing YCxCz values from XYZ values (1310); determining the maximum range of resulting YCxCz values (1315); computing an error metric D based on how close to the allowable limits the resulting values are (1320); minimizing the error metric (1325) using, for example, least-squares optimization routines, or other alternative optimization routines.

Referring again to FIG. 12, further steps after step (1255) can comprise: reporting the final optimized matrix $M_o$, where the optimized matrix is based on adjusting the default standard matrix $M_s$, for example through the scaler S.

Figure 14:
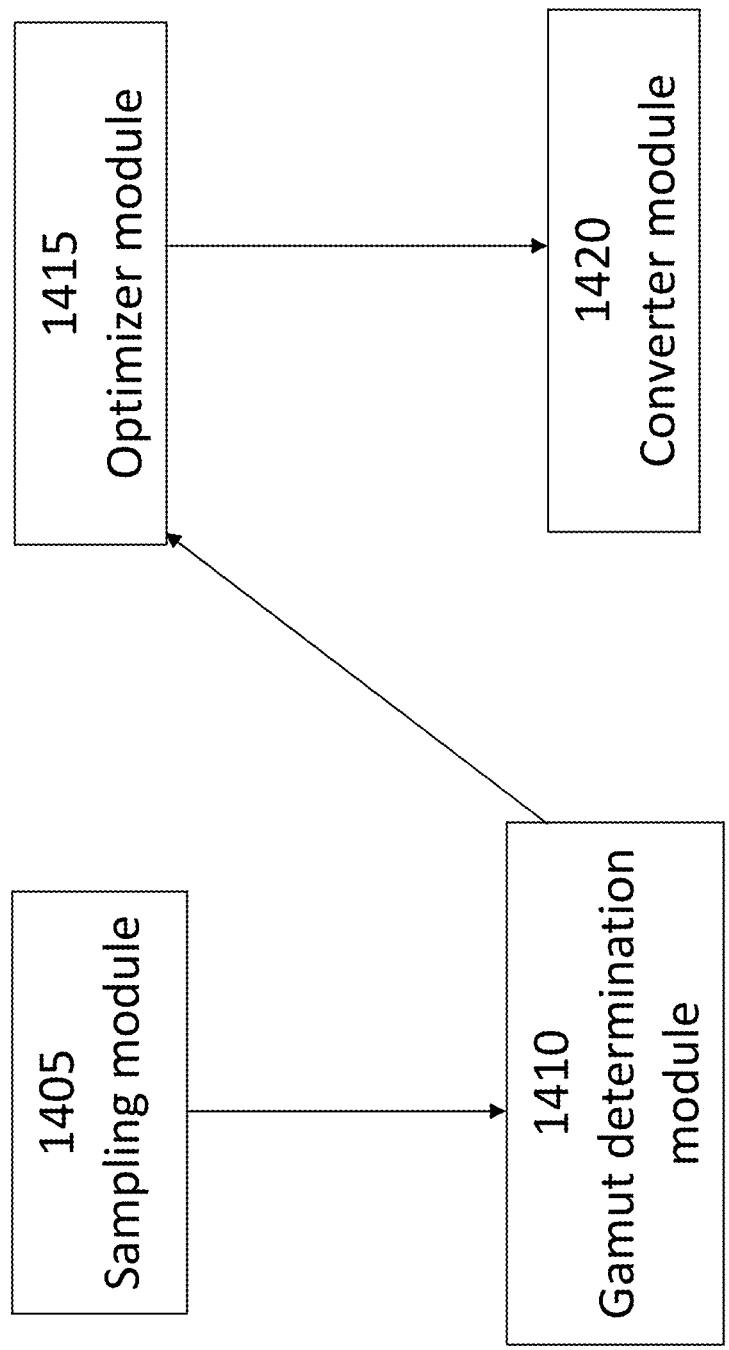
FIG. 14 illustrates an exemplary system converting color values.

FIG. 14 illustrates an exemplary embodiment of a system to convert color values between color spaces, based on the optimization of a transformation matrix, as described in several embodiments of the disclosure. An exemplary system may comprise a sampling module (1405) configured to sample color values of an image; a gamut determination module (1410), configured to determine whether a color value is in-gamut; an optimizer module (1415), configured to optimize a transformation matrix between color spaces; and a converter module (1420), configured to convert color values between the color spaces.

In some embodiments, an exemplary method may comprise the following steps:
 a) Reading source content
 b) Converting to XYZ (if necessary)
 c) Determining optimal YCC matrix
 d) Applying optimal YCC matrix
 e) Chroma subsampling (if necessary)
 f) Distributing resulting YCC image and metadata describing optimal YCC matrix (or the inverse of the matrix)

Figure 15:
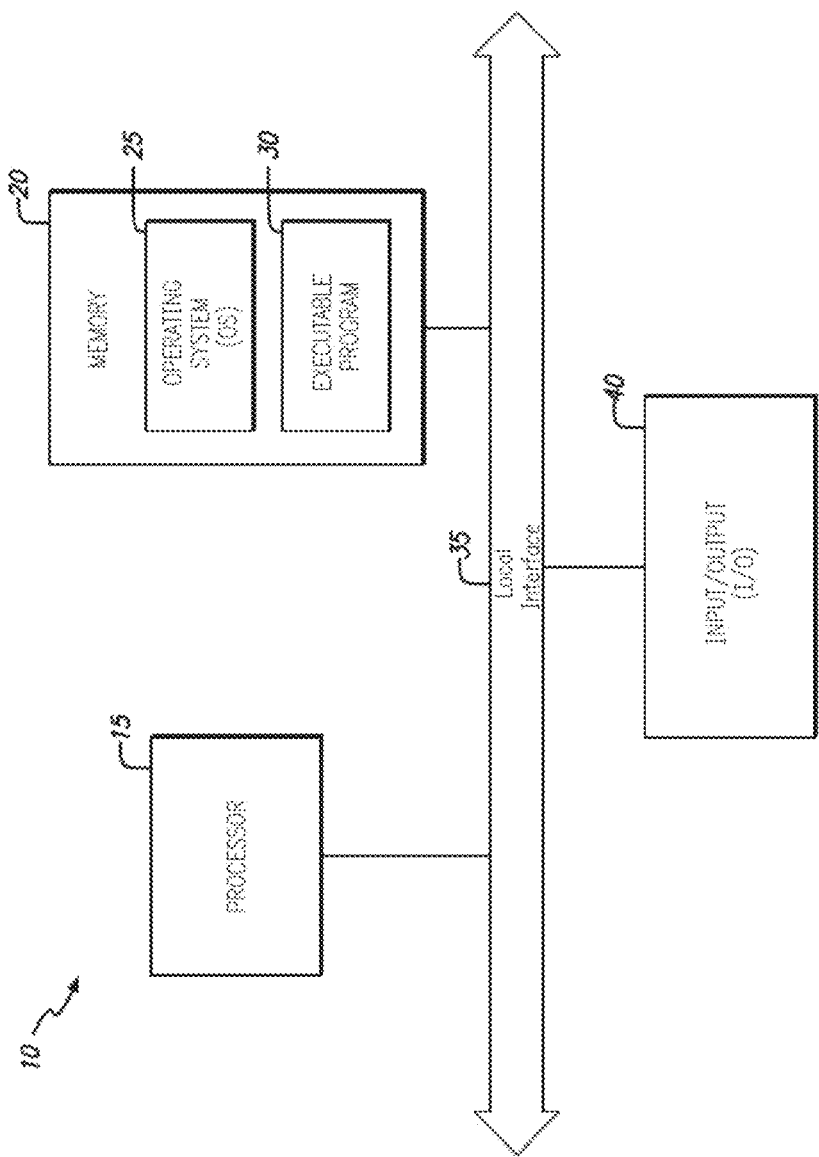
FIG. 15 depicts an exemplary embodiment of a target hardware for implementation of an embodiment of the present disclosure.

In some embodiments, a method for decoding may comprise the following steps:
 a) Reading YCC image and YCC matrix from metadata
 b) Chroma upsample (if necessary)
 c) Applying inverse YCC matrix to convert to XYZ FIG. 15 is an exemplary embodiment of a target hardware (10) (e.g. a computer system) for implementing the embodiments of FIGS. 1-14. This target hardware comprises a processor (15), a memory bank (20), a local interface bus (35) and one or more Input/Output devices (40). The processor may execute one or more instructions related to the implementation of FIGS. 1-14, and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 15. In some embodiments a plurality of processors may be used in a parallel configuration for added execution speed. In such a case, the executable program may be specifically tailored to a parallel execution. Also, in some embodiments the processor (15) may execute part of the implementation of FIGS. 1-14, and some other part may be implemented using dedicated hardware/firmware placed at an Input/Output location accessible by the target hardware (10) via local interface (35). The target hardware (10) may include a plurality of executable program (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:
1. A method to perform opponent color space conversion, the method comprising:
 generating, by a computer, one or more codewords in a first opponent color space;
 performing a color space conversion, thereby converting the one or more codewords in the first opponent color space to a second opponent color space; and optimizing, by the computer, the color space conversion in order to increase a number of colors in the second opponent color space that can be perceived by a human visual system.

2. The method of claim 1, wherein the generating further comprises defining, by the computer, sampled colors corresponding to RGB or XYZ color space; and wherein the optimizing further comprises determining, by the computer, which color values of the sampled colors fall inside a spectral locus, thereby obtaining in-gamut colors.

3. The method of claim 2, wherein the determining further comprises optimizing, by the computer, an opponent color conversion transformation matrix for the in-gamut colors, thereby obtaining an optimized transformation matrix.

4. The method of claim 1, wherein the generating comprises characterizing a target image for display on a display device, the characterizing comprising computing, by the computer, a sampled array of color values for the target image; and the optimizing further comprises determining, by the computer, which color values of the sampled array of color values fall inside a spectral locus, thereby obtaining in-gamut color values.

5. The method of claim 4, further comprising:
converting, by the computer, the in-gamut color values to a XYZ color space, thereby obtaining XYZ color values;
encoding, by the computer, the XYZ color values with a non-linear function;
defining, by the computer, an opponent color conversion transformation matrix for the XYZ color values; and
optimizing, by the computer, the opponent color conversion transformation matrix, thereby obtaining an optimized transformation matrix.

6. The method of claim 5, further comprising converting, by the optimized transformation matrix, wide-gamut color values of a color space where one or more of the primaries is outside of the spectrum locus.

7. The method of claim 5, further comprising converting, by the optimized transformation matrix, the XYZ color values to YCC color values.

8. The method of claim 5, wherein the sampled array of color values is sampled from a P3 color space.

9. The method of claim 5, wherein the optimizing comprises optimizing for the spectral locus.

10. The method of claim 9, wherein the opponent color conversion transformation matrix and the optimized transformation matrix are for wide gamut color spaces.

11. The method of claim 5, wherein the optimizing comprises optimizing for at least one color space and/or gamut related to the target image, a capture device, a display device, or a digital camera.

12. The method of claim 5, wherein the determining comprises:
converting, by the computer, the sampled array of color values to the Yxy color space, thereby obtaining Yxy color values;
loading, by the computer, sampled color values along the spectral locus, thereby obtaining spectral locus sampled color values;
converting, by the computer, the spectral locus sampled color values to Yxy color space, thereby obtaining Yxy color values;
computing, by the computer, a triangulation based on the spectral locus; and
checking, by the computer, at least one sampled color value, wherein the checking comprises
determining, by the computer, if the at least one sampled color value is within an area delimited by the spectral locus, thereby obtaining in-gamut color values if the at least one sampled color value is within the area, and out-of-gamut color values if the at least one sampled color value is outside the area.

13. The method of claim 12, wherein the triangulation is a Delaunay triangulation.

14. The method of claim 5, wherein the non-linear function is a PQ function.

15. The method of claim 5, wherein the optimizing comprises optimizing on a scene-by-scene and/or frame-by-frame basis.

16. The method of claim 5, wherein the optimizing comprises optimizing for a specific video content.

17. The method of claim 5, wherein the optimizing comprises optimizing with an unconstrained white point.

18. The method of claim 5, further comprising determining a visual difference between color values obtained from the optimized transformation matrix and color values obtained from the opponent color conversion transformation matrix, and wherein the optimizing is based on the visual difference.

19. The method of claim 1, wherein the optimizing comprises converting, by the computer, only the in-gamut color values.

20. The method of claim 1, wherein the optimizing comprises optimizing a white color point.

21. The method of claim 20, wherein the optimized white point is located at coordinates (0.5, 0.5).

22. The method of claim 1, wherein the optimizing comprises:
finding, by the computer, a scaler function;
computing, by the computer, $YC_xC_z$ color values from the XYZ color values;
determining, by the computer, a maximum range of the $YC_xC_z$ color values;
computing, by the computer, an error metric function for the $YC_xC_z$ color values; and
minimizing, by the computer, the error metric function.

23. The method of claim 22, wherein computing the error metric function comprises determining, by the computer, a distance in color space between computed $YC_xC_z$ color values and allowable $YC_xC_z$ color values.

24. The method of claim 22, wherein the minimizing comprises a least-squares optimization routine.

25. The method of claim 22, wherein the optimizing comprises adjusting, by a computer, the opponent color conversion transformation matrix through the scaler function.

26. A system comprising:
a sampling module, configured to sample color values of an image;
a gamut determination module, configured to determine whether a color value is in-gamut;
an optimizer module, configured to optimize a transformation matrix between a first opponent color space and a second opponent color space in order to increase a number of colors in the second opponent color space that can be perceived by a human visual system; and
a converter module, configured to convert color values in the first opponent color space to the second opponent color space.

* * * * *